Dec. 1, 1931.  W. C. KLEIN  1,834,847
ROLLER BEARING DIFFERENTIAL WHEEL
Filed Feb. 26, 1931  2 Sheets-Sheet 2
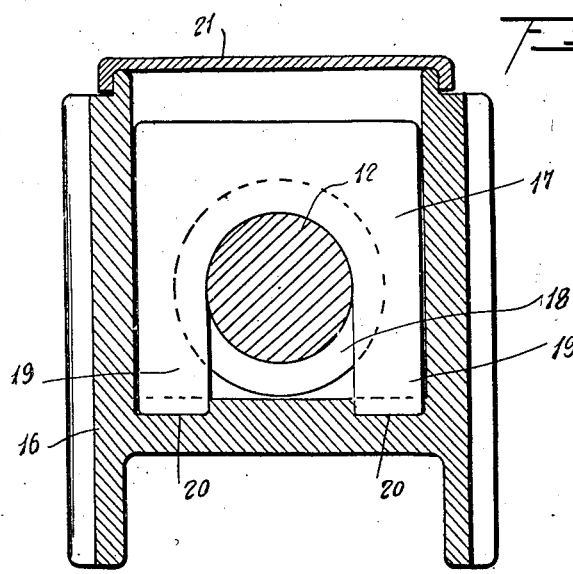
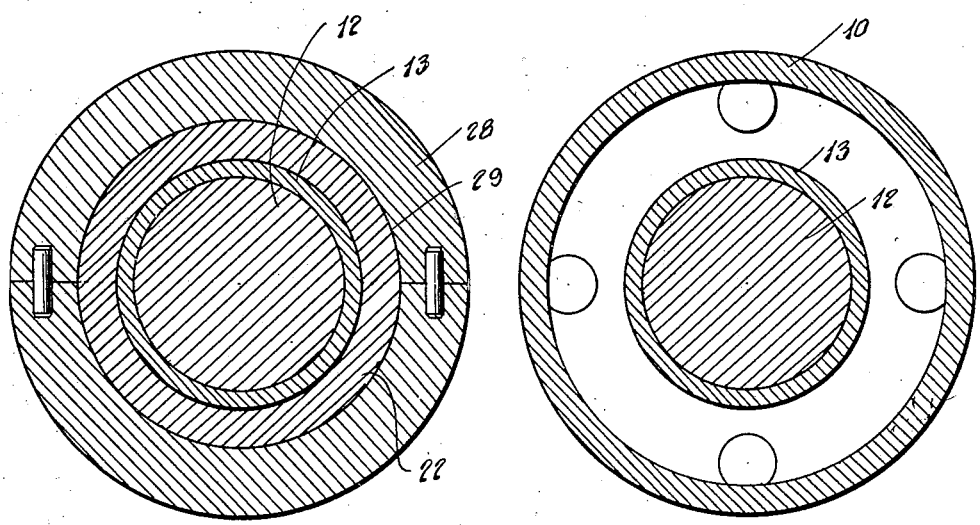
Inventor
W. C. Klein
By L. F. Randolph Jr.
Attorney Patented Dec. 1, 1931

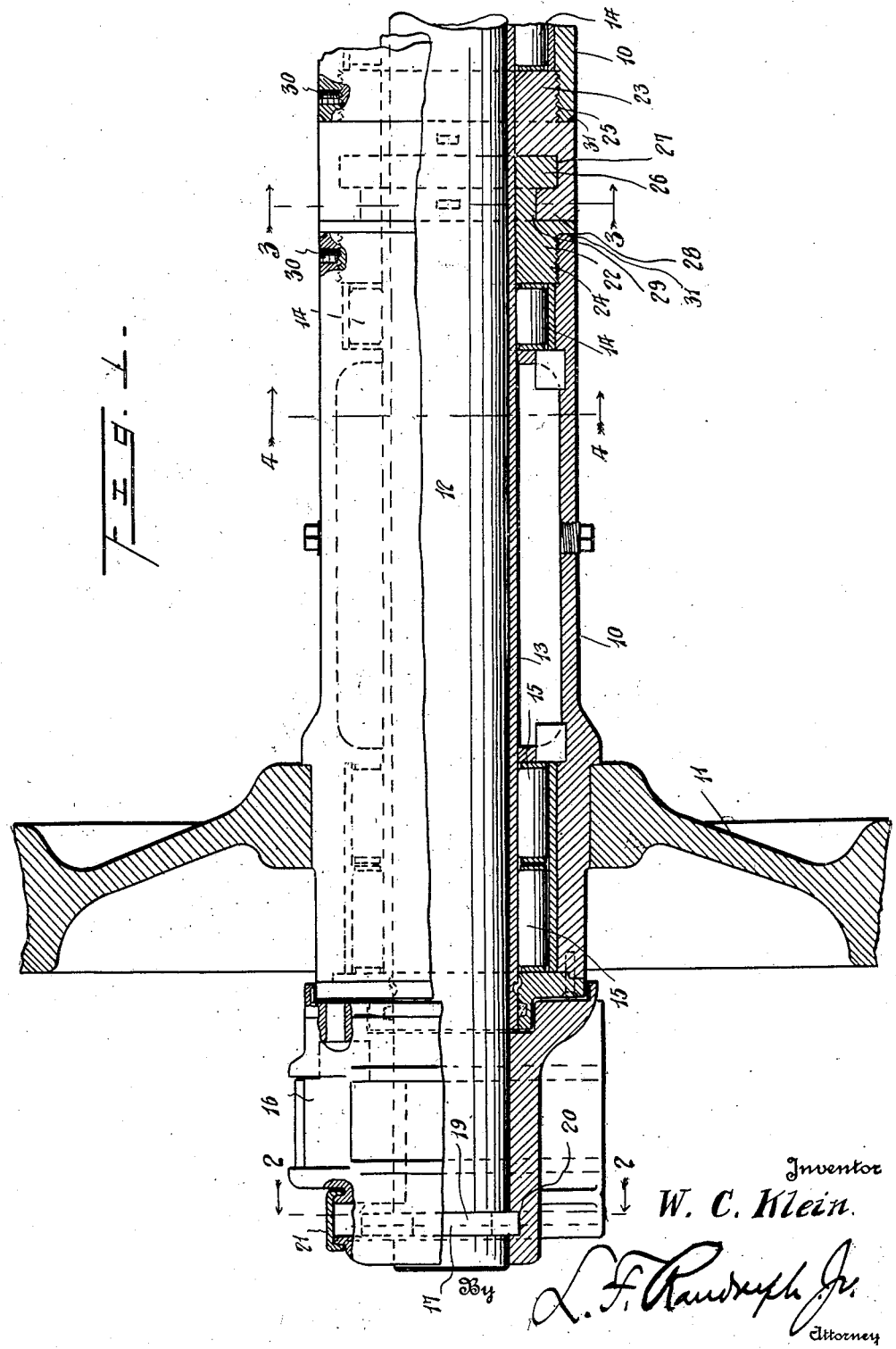

1,834,847

UNITED STATES PATENT OFFICE

WILLIAM C. KLEIN, OF ALLENTOWN, PENNSYLVANIA

ROLLER BEARING DIFFERENTIAL WHEEL

Application filed February 26, 1931. Serial No. 518,557.

This invention relates to a roller bearing differential wheel of the general type heretofore invented by me and disclosed for instance in application Serial No. 390,558, filed September 5, 1929.

The present invention aims to provide a novel means for connecting together the relatively or differentially movable wheel-carrying housings in a manner to insure their remaining together and further by a means which avoids the use of bolts or a multiplicity of parts.

Another object is to provide a novel construction utilizing a check plate to tie the assembly together, in place of a pedestal key as in my previous construction, so as to permit a slight creepage of the axle if desired and so as to enable the plate to be readily removed.

Various additional objects and advantages will become apparent from a consideration of the description following taken in connection with accompanying drawings illustrating an operative embodiment.

In said drawings:—

Figure 1 is a partial view in central longitudinal section and in elevation, illustrating the improvements, Figure 2 is a cross sectional view taken on the line 2—2 of Figure 1, Figure 3 is a cross sectional view taken on the line 3—3 of Figure 1, and Figure 4 is a cross sectional view taken on the line 4—4 of Figure 1.

Referring specifically to the drawings, the invention utilizes two housings 10, which are similar, and each of which has a wheel 11 keyed or fixed thereto. Such housings 10 are adapted for relative or differential rotation about an axle 12, a sleeve 13 being interposed between the axle and housing 10, with roller bearings or the equivalent 14 and 15 also being interposed.

Pedestal boxes 16 mount the axle 12 at each end and check plates 17 are removably applicable therein, being substantially U-shaped, so as to straddle the axle 12, entering grooves 18 about the same and providing legs 19 interfitting in recesses 20 of the pedestal boxes 16. A removable cap 21 is provided on the boxes over the space in which the plates 17 are disposed. The plates 17 are used in lieu of the pedestal keys in my previous construction with a view to tying the assembly together, permitting removal of the plates at will, and also to permit a slight creepage of the axle 12 if desired.

At the inner ends of the housings 10, connecting sections 22 and 23 are provided. Section 22 is detachably screw threaded at 24 in one of the housings 10 while the section 23 is screw threaded at 25 into the other section 10. Section 22 is of male form while the section 23 is of female form inasmuch as the former has an outwardly extending annular flange 26 engaging a groove 27 of the section 23 while the latter section has an inwardly extending flange 28 engaging a groove 29 of the section 22. In this manner, the sections 22 and 23 are connected together against relative axial longitudinal movement but in such manner that they may swivel or rotate relatively to each other and since they are connected to the sections 10, the latter are connected for similar movement so that the wheels 11 may have differential movement.

In assembling the sections 22 and 23, the section 23 is preferably made in halves which are welded together into uniform, after the parts are assembled in operative relation as in Figure 1.

In order to prevent loosening of the sections 22 and 23, binding or lock screws 30 may be threaded into the housings 10 and engage the sections. In addition to the screws 30 the housings 10 may be welded to the connecting sections 22 and 23 as shown at 31.

Various changes may be resorted to provided they fall within the spirit and scope of the invention.

What is claimed is:—

1. In a differential wheel construction, wheel-mounting housings, connecting sections respectively secured to adjacent ends of said housings, said sections being interfitted whereby the housings may have differential movement, one of said housings having an outwardly extending flange and the other housing having an inwardly extending flange preventing relative axial movement of the sections.

2. In a differential wheel construction, wheel-mounting housings, connecting sections respectively secured to adjacent ends of said housings, said sections being interfitted whereby the housings may have differential movement, and said sections being screw threaded into said housings.

3. In a differential wheel construction, wheel-mounting housings, connecting sections respectively secured to adjacent ends of said housings, said sections being interfitted whereby the housings may have differential movement, one of said housings having an outwardly extending flange and the other housing having an inwardly extending flange preventing relative axial movement of the sections, said sections being screw threaded into said housings, and one of said sections being initially in segments to enable attachment to the other.

4. A device of the class described having an axle, a housing about the same, a wheel carried by the housing, a pedestal box receiving one end of the axle and provided with a groove, and a check plate removably disposed in said groove and interfitted with said box.

In testimony whereof I affix my signature.

WILLIAM C. KLEIN.